(12) United States Patent
May et al.

(10) Patent No.: US 7,882,383 B2
(45) Date of Patent: Feb. 1, 2011

(54) SYSTEM ON A CHIP WITH RTC POWER SUPPLY

(75) Inventors: Marcus W. May, Austin, TX (US); David A. Dyches, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 949 days.

(21) Appl. No.: 11/789,763

(22) Filed: Apr. 25, 2007

(65) Prior Publication Data
US 2008/0104433 A1 May 1, 2008

(51) Int. Cl.
*G06F 1/00* (2006.01)
*G05F 1/00* (2006.01)

(52) U.S. Cl. .................. 713/500; 713/300; 323/280; 323/281

(58) Field of Classification Search .......... 713/300, 713/500; 323/280, 281
See application file for complete search history.

(56) References Cited

U.S. PATENT DOCUMENTS

| | | | | |
|---|---|---|---|---|
| 6,356,061 B1* | 3/2002 | Perillo | ................ | 323/274 |
| 6,445,167 B1* | 9/2002 | Marty | ................ | 323/280 |
| 7,161,999 B2* | 1/2007 | Parikh | ................ | 375/354 |
| 7,370,214 B2* | 5/2008 | Sheng et al. | ................ | 713/300 |
| 2004/0107373 A1* | 6/2004 | Ferrara | ................ | 713/300 |

OTHER PUBLICATIONS

Sigmatel STMP35xx Product Data Sheet, Sep. 17, 2003, pp. 4, 10, 335.*
Sigmatel STMP3600 Product Brief, Sigmatel Mixed-Signal Multimedia Semiconductors, 2 pages.

* cited by examiner

*Primary Examiner*—Ji H Bae
(74) *Attorney, Agent, or Firm*—Ingrassia Fisher & Lorenz, P.C.

(57) ABSTRACT

A system on a chip includes a real time clock (RTC) module, a crystal oscillation circuit and a voltage supply circuit. The RTC module is coupled to provide timing functions and the crystal oscillation circuit is coupled to produce an oscillation. The voltage supply circuit is coupled to produce a supply voltage for at least a portion of the RTC module and the crystal oscillation circuit. The voltage supply circuit includes: a reference circuit coupled to produce a reference voltage based on the supply voltage; a transistor coupled to the battery IC pin, wherein the transistor produces the supply voltage based on a regulation signal and the battery voltage; an amplifier coupled to produce the regulation signal based on the reference voltage and a feedback representation of the supply voltage; and a start-up circuit coupled to enable the voltage supply circuit at battery connection.

12 Claims, 4 Drawing Sheets voltage supply circuit 35

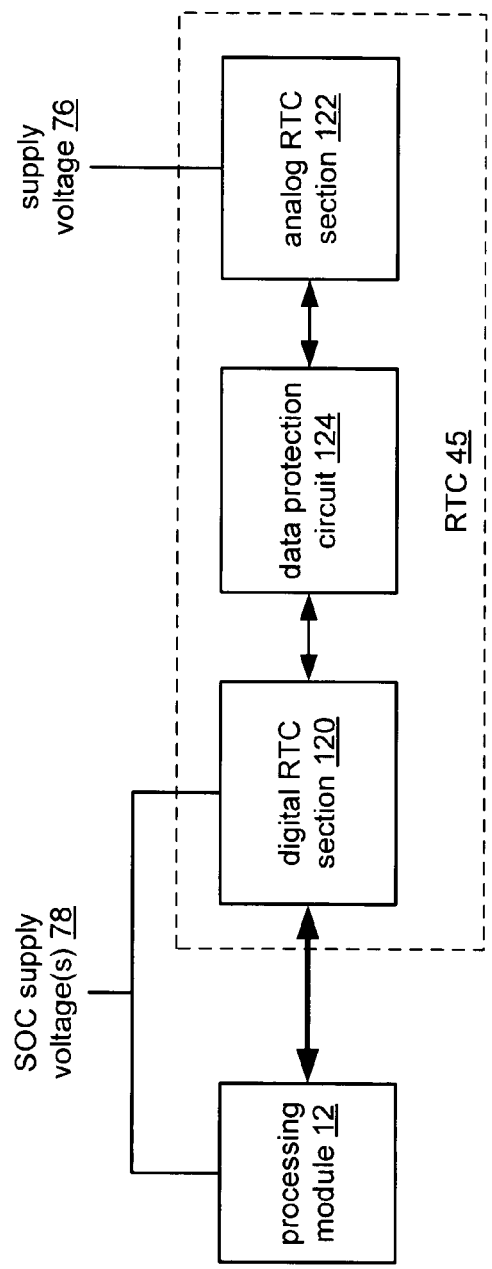
FIG. 4
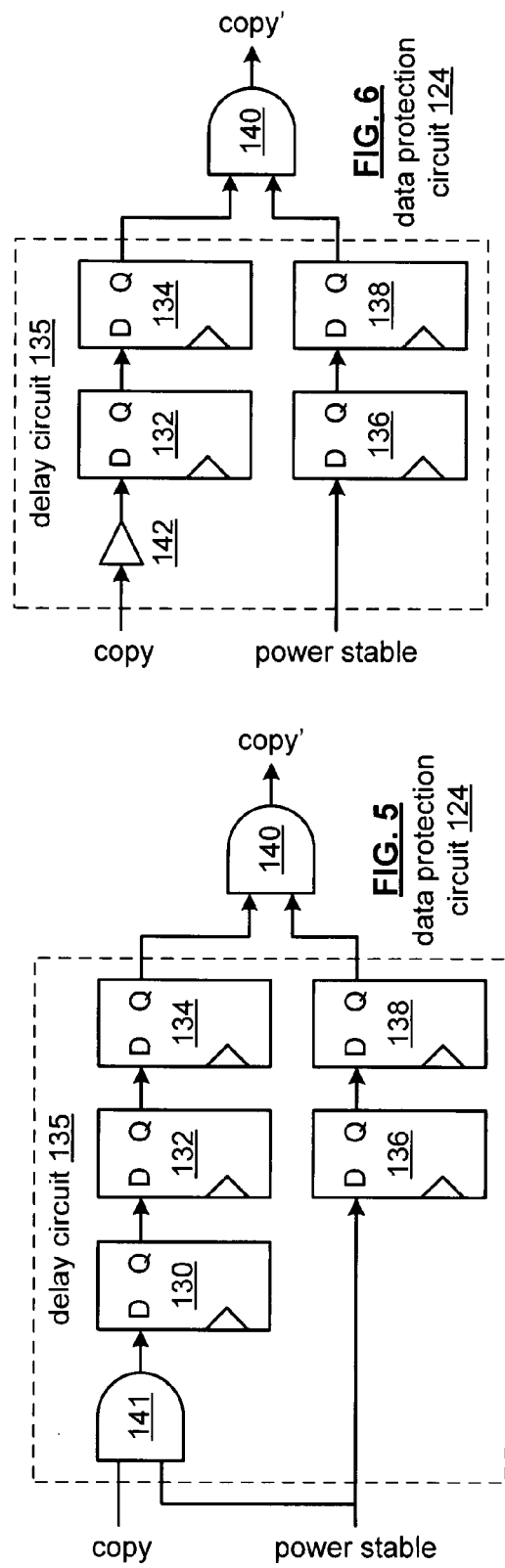
FIG. 5
FIG. 6

US 7,882,383 B2

SYSTEM ON A CHIP WITH RTC POWER SUPPLY

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to mixed signal integrated circuits and more particularly to powering a real time clock module and/or crystal oscillation circuit of a system on a chip.

2. Description of Related Art

In general, a system on a chip (SOC) integrates multiple independent circuits, which are typically available as individual integrated circuits, on to a single integrated circuit. For example, an audio processing SOC combines a processing core (e.g., microprocessor and/or digital signal processor, instruction cache, and data cache), an audio codec (e.g., digitization of analog audio input signals and converting digitized audio signals into analog output signals), a high speed serial interface (e.g., universal serial bus (USB) interface), a real time clock (RTC), a crystal oscillation circuit, and an external memory interface.

When an audio processing SOC is incorporated in a battery powered device, the RTC and the crystal oscillation circuit need to be powered directly from the battery and not from a power supply (e.g., DC-DC converter) that is enabled when the battery powered device is enabled. One issue with powering the RTC and the crystal oscillation circuit from the battery is the use of different batteries (e.g., an alkaline battery produces a voltage of 0.9 to 1.5 volts and a lithium-ion battery produces a voltage of 3.0 to 4.2 volts). One known solution is to provide a linear regulator that generates a supply voltage of approximately equal to the battery voltage when an alkaline battery is used and generates a supply voltage of approximately one-half the battery voltage when the lithium-ion battery is used.

While this technique works for integrated circuit (IC) fabrication processes that have power supply requirements of up to 2.0 volts, newer IC fabrication processes (e.g., 90 nanometer CMOS) have much lower power supply voltage limitations (e.g., less than 1.3 volts). As such, for SOCs developed using new IC fabrication processes, a new technique is required to power the RTC and the crystal oscillation circuit from the battery.

Another issue with the RTC is the potential loss of data at power down of the battery power device. As is known, the RTC includes a digital section and an analog section, where the analog section is powered from the battery and the digital section is powered from the DC-DC converter. At power down, the DC-DC converter is turned off, but as long as the battery is connected, the analog section of the RTC is active. When this state occurs and data is being transferred between the analog section and the digital section, the data can be corrupted or lost. The potential corruption or loss of data is even greater when the power down occurs near an edge of a clock signal.

Therefore, a need exists for an improved RTC module and an improved power generation technique for the RTC module and a crystal oscillation module.

BRIEF DESCRIPTION OF THE SEVERAL VIEWS OF THE DRAWING(S)

FIG. 4 is a schematic block diagram of an embodiment of an RTC module in accordance with the present invention;

FIG. 5 is a schematic block diagram of an embodiment of a data protection circuit in accordance with the present invention; and FIG. 6 is a schematic block diagram of an embodiment of a data protection circuit in accordance with the present invention.

DETAILED DESCRIPTION OF THE INVENTION

Figure 1:
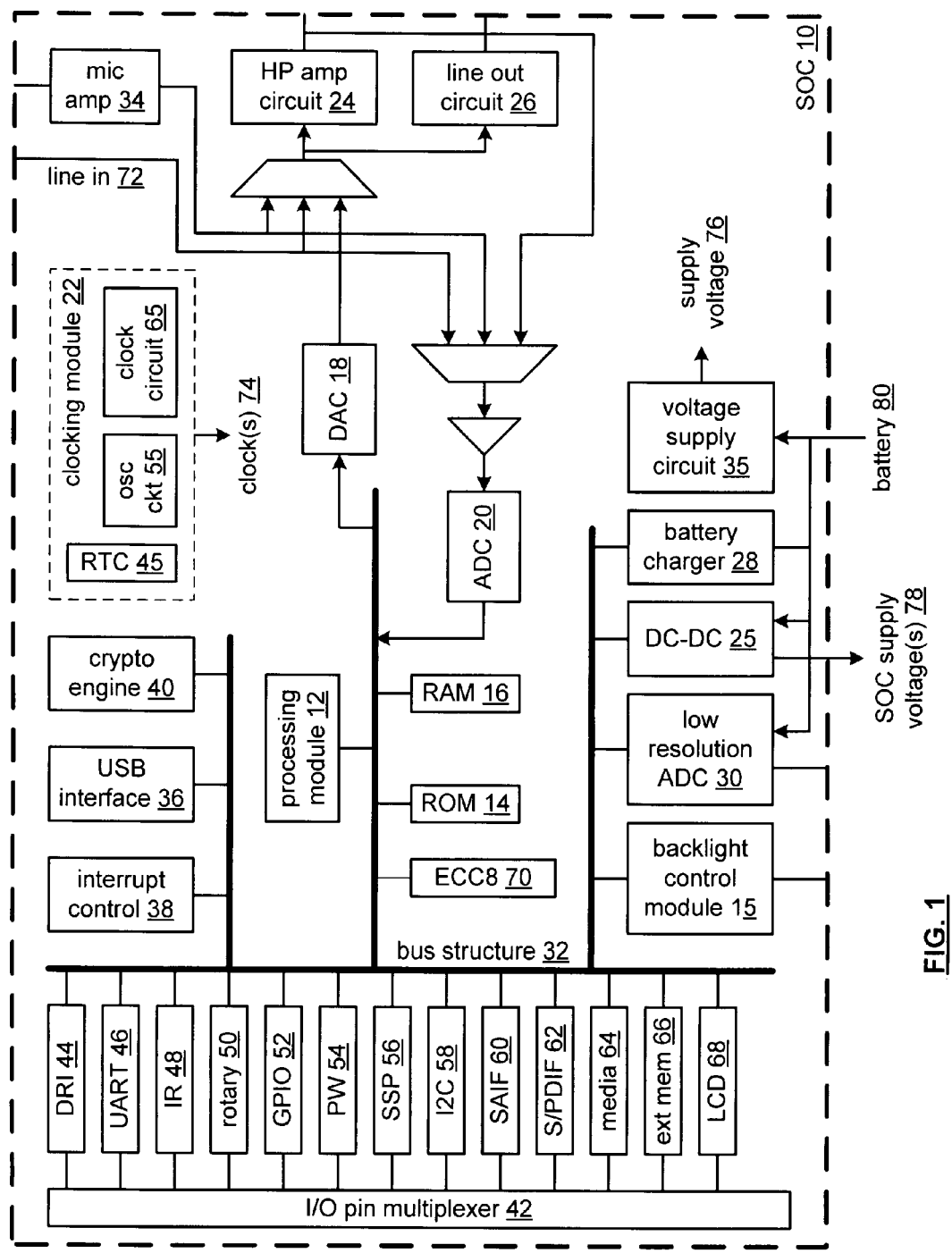
FIG. 1 is a schematic block diagram of a system on a chip (SOC) in accordance with the present invention.

FIG. 1 is a schematic block diagram of a system on a chip (SOC) 10 that may be used in a portable entertainment device (e.g., an MP3 player, an advanced MP3 player (i.e., music, photos, and video playback), cellular telephones, personal computers, laptop computers, and/or personal digital assistants. The SOC 10 includes at least some of a processing module 12, read only memory (ROM) 14, a backlight control module 15, random access memory (RAM) 16, a digital to analog conversion (DAC) module 18, an analog to digital conversion (ADC) module 20, a clocking module 22, a headphone (HP) amplifier circuit 24, a DC-DC converter 25, a line out circuit 26, a battery charger 28, a low resolution ADC 30, a bus structure 32, a microphone amplifier 34, a universal serial bus (USB) interface 36, an interrupt controller 38, a crypto engine 40, an input/output pin multiplexer 42, a plurality of interface modules 44-68, an ECC8 module 70, and a line in pin 72.

The clocking module 22 includes one or more of a real time clock (RTC) module 45, an oscillation circuit 55, and a clock circuit 65. In one embodiment, the oscillation circuit 55 is coupled to an off-chip crystal and produces therefrom an oscillation. The clock circuit 65 may use the oscillation as a reference oscillation to produce one or more clock signals 74 that are used by at least some of the other blocks of the SOC. The RTC module 45 provides timing functions such as a second counter, a programmable millisecond interrupt, an alarm interrupt and power-up facility, a watchdog reset, and storage and access to persistent registers.

The plurality of interface modules 44-68 includes at least some of a digital recording interface (DRI) interface 44, a universal asynchronous receiver-transmitter (UART) interface 46, an infrared (IR) interface 48 (e.g., IrDA), a rotary controller 50, a general purpose input/output (GPIO) interface 52, a pulse width (PW) interface 54, a synchronous serial port (SSP) interface 56, an I2C interface 58, a serial audio input (SAIF) transmit and/or receive interface 60, a Sony Philips Digital Interface (SPDIF) 62, a media interface 64, an external memory interface 66, and a liquid crystal display (LCD) interface 68. In an application, the DRI interface 44 may be used to interface with a stereo FM (frequency modulated) receiver; the UART interface 46 may be used to interface with a host device and/or be used to debug the SOC; the IR interface 48 may be used to provide peer-to-peer IR communication; the pulse width interface 54 may be used in connection with the backlight control module 15 to control backlighting of a display and/or to provide an output beep; the SSP interface 56 may be used to interface with off-chip devices having one or more of an multimedia card (MMC) interface, a scientific data (SD) interface, a secure digital input/output (SDIO) interface, a consumer electronics-AT attachments (CE-ATA) interface, a Triflash interface, a serial peripheral interface (SPI), and a master software (MS) interface; the S/PDIF interface 62 may be used to interface with off-chip devices having an S/PDIF transmit and/or receive interface; the media interface 64 may be used to interface with a hard drive, NAND flash or compact flash to transceiver digitized audio, video, image, text, and/or graphics data; the external memory interface 66 may be used to interface with an SDRAM, a NOR memory, and/or a mobile double data rate (mDDR) memory device; and the LCD interface 68 may be used to interface with a display.

The DC-DC converter 25, which may be a buck and/or boost converter, generates one or more SOC supply voltages 78 from a battery 80. For example, the DC-DC converter 25 may produce a 1.2 V supply voltage, a 1.8 V supply voltage, and a 3.3 V supply voltage. Note that the DC-DC converter 25 may use a single off-chip inductor to produce the SOC supply voltages 78. Further note that when the SOC 10 is receiving power from a source other than the battery 80 (e.g., 5 V from a USB connection), the DC-DC converter 25 may generate one or more the SOC voltages from the alternative power source. When the alternate power source is available, the battery charger 28 may be enabled to charge the battery 80.

In operation, the processing module 12 coordinates the recording, playback, and/or file management of multimedia data (e.g., voice, audio, text, data, graphics, images, and/or video). The processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 12 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 12 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-5.

In a playback mode of operation, the processing module 12 coordinates the retrieval of multimedia data from off-chip memory via one of the interfaces 44, 48, 52, 56, 60, 62, 64, and/or 66. The retrieved data is routed within the SOC via the bus structure 32, which may include a peripheral bus and an advanced high-performance bus. If the retrieved data is encrypted, the crypto engine 40 decrypts the retrieved data to produce decrypted retrieved data. If the decrypted retrieved data is encoded (e.g., is an MP3 file, WMA file, MPEG file, JPEG file, etc.), the processing module 12 coordinates and/or performs the decoding of the retrieved data to produce digitized data. An audio component of the digitized data is provided to the DAC module 18, which may include one or more digital to analog converters. The DAC 18 converts the digitized audio component into analog audio signals. The headphone amplifier circuit 24 and the line out circuit 26 provide the analog audio signals off-chip. A video or image component of the digitized data is provided to the LCD interface for display.

In an audio record mode, the processing module 12 coordinates the storage of analog audio input signals received via the microphone amplifier 34 or the line input 72. In this mode, the ADC module 20 converts the analog audio input signals into digitized audio signals which are then placed on the bus structure. In one embodiment, the processing module 12 may coordinate the storage of the digitized audio signals in an off-chip memory device. In another embodiment, the processing module 12 coordinates and/or performs encoding (e.g., MP3, WMA, etc.) of the digitized audio signals to produce encoded audio signals, which are subsequently stored in off-chip memory.

In a file management mode, the processing module 12 coordinates the transferring, editing, and/or deleting of files (e.g., MP3 files, WMA files, MPEG files, JPEG files, and/or any other type of music, video and/or still image files) with a host device via the USB interface 36. For example, the host device (e.g., a laptop or PC) may download a music file to the portable entertainment device that includes the SOC 10 via the USB interface 36. The USB interface 36 places the music file on the bus structure 32 and it is routed to the desired destination under the control of the processing module 12. Note that the interrupt control module 38 facilitates the various modes of operation by processing interrupts, providing timers, and direct memory access.

Figure 2:
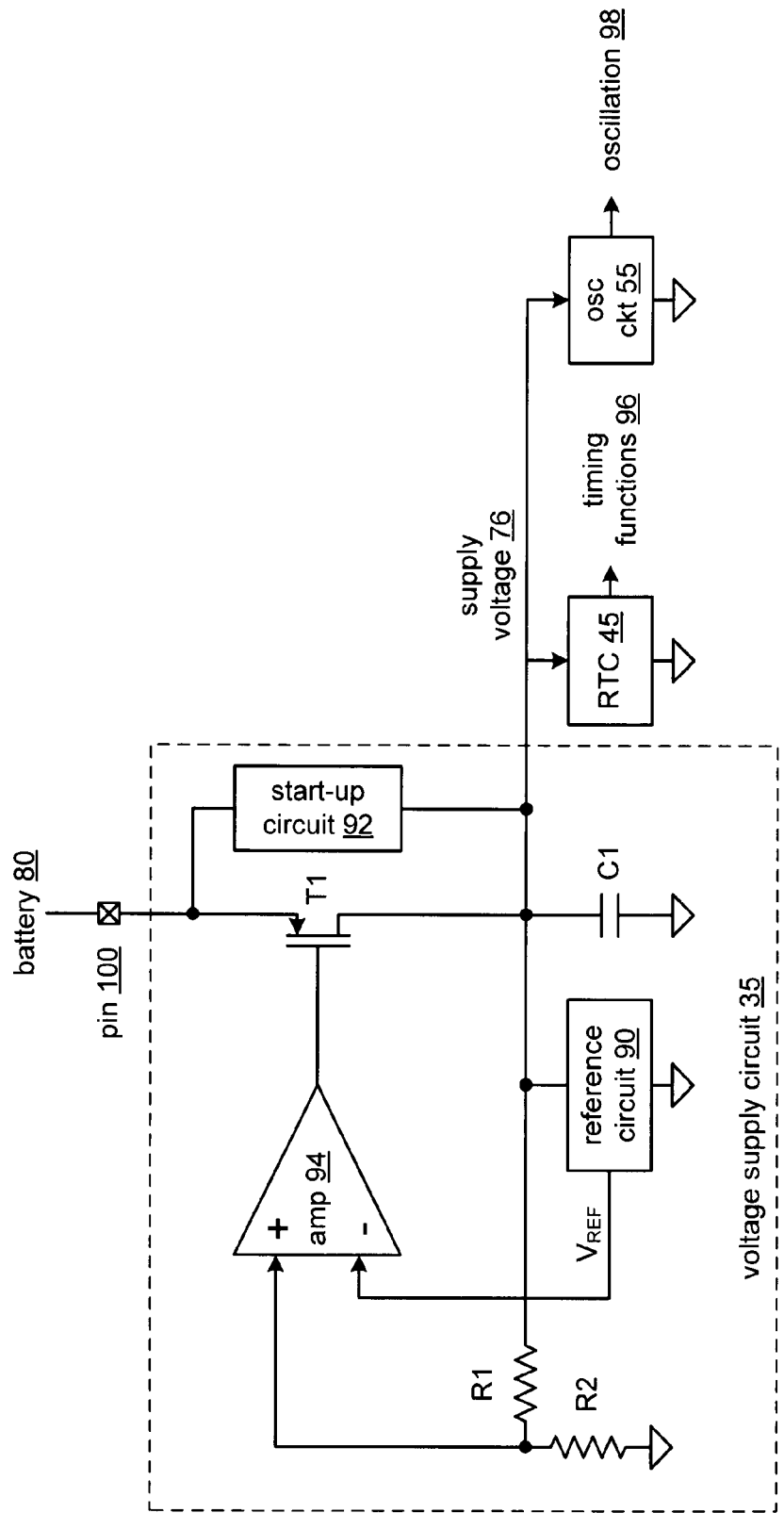
FIG. 2 is a schematic block diagram of an embodiment of a voltage supply circuit powering a real time clock (RTC) module and an oscillation circuit in accordance with the present invention.

FIG. 2 is a schematic block diagram of an embodiment of a voltage supply circuit 35 powering a real time clock (RTC) module 45 and an oscillation circuit 55. The voltage supply circuit 35 includes a reference circuit 90, a start up circuit 92, an amplifier 94, resistors R1 and R2, a transistor T1, and a capacitor C1.

When a battery is coupled to an integrated circuit (IC) pin 100, the voltage supply circuit 35 is active to produce a supply voltage 76 that powers at least an analog RTC section of the RTC module 45 and the oscillation circuit 55. With power applied, the analog RTC section processes timing functions 96 and the oscillation circuit 55, which may be a crystal oscillation circuit, produces an oscillation 98. Note that the timing functions 96 include one or more of a second counter, a programmable millisecond interrupt, an alarm interrupt and power-up facility, a millisecond counter, and a watchdog timer, a watchdog reset, and storage and access to persistent registers.

To produce the supply voltage 76 when the battery is first connected, the start up circuit 92 pulls the supply voltage 76 line towards the battery voltage. Once there is sufficient voltage on the supply voltage 76 line, the start up circuit 92 shuts down and the reference circuit 90, which may be a bandgap reference, the amplifier 94, and the transistor T1 produce a regulated supply voltage 76. For example, the reference circuit 90 may produce a 0.6 volt voltage reference ($V_{REF}$), which forces the center tap of the resistors R1 and R2 to be 0.6 volts. Thus, the ratio of R1 to R2 dictates the value of the supply voltage 76. For newer IC fabrication processes, it is desirable to have a supply voltage of 1.0 volts or less. In this example, if a 0.9 volt supply voltage is desired, R2 has twice the resistance as R1. With such a voltage supply circuit 35, the supply voltage 76 can be regulated to a desired voltage regardless of the type of battery being used.

Figure 3:
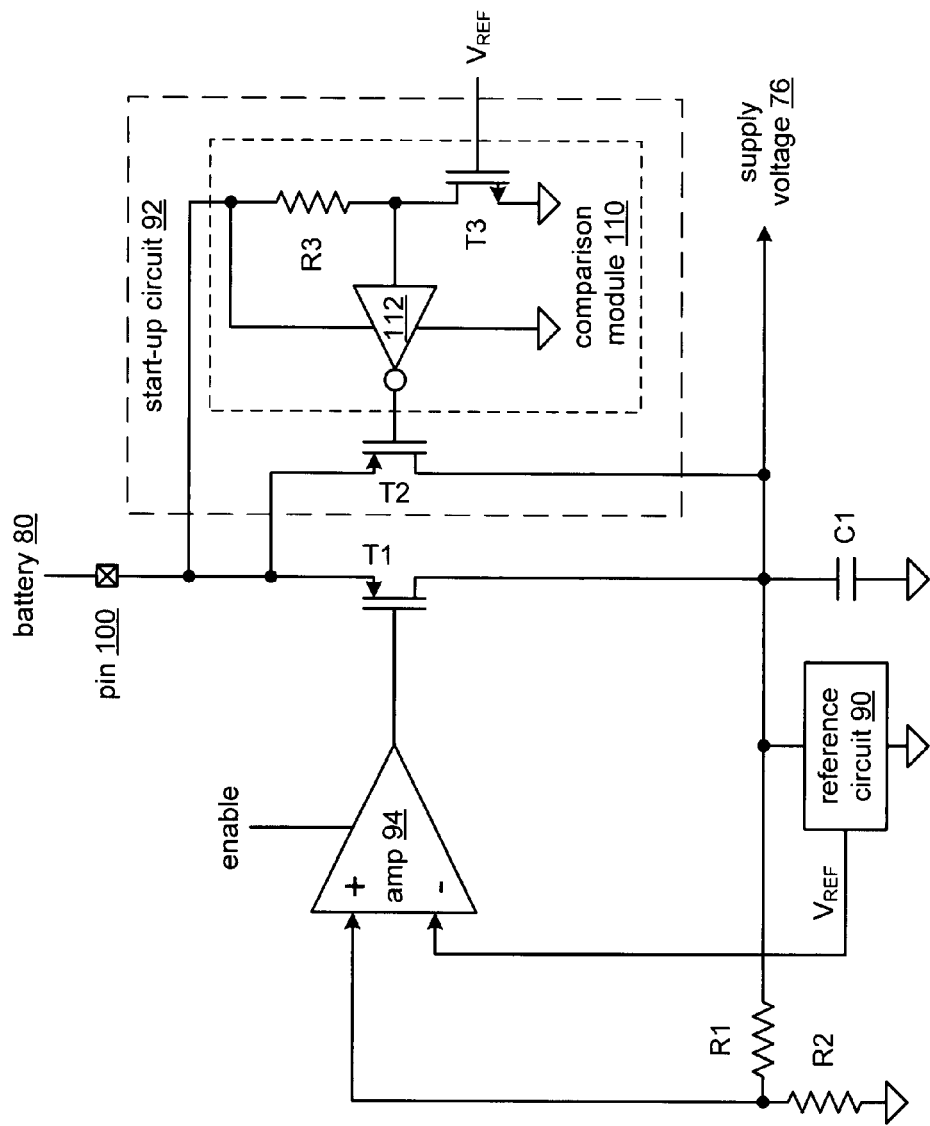
FIG. 3 is a schematic block diagram of another embodiment of a voltage supply circuit in accordance with the present invention.

FIG. 3 is a schematic block diagram of another embodiment of a voltage supply circuit 35 that includes a reference circuit 90, a start up circuit 92, an amplifier 94, resistors R1 and R2, a transistor T1, and a capacitor C1. In this embodiment, the start up circuit 92 includes a transistor T2 and a comparison module 110. In one embodiment, the comparison module 110 includes a transistor T3, an inverter 112, and a resistor R3.

As shown, the second transistor T2 is coupled to the battery IC pin 100 and to the transistor T1. The comparison module 110 compares the reference voltage ($V_{REF}$) with a threshold. In one embodiment, the threshold is a voltage. When the reference voltage compares unfavorably with the threshold, the comparison module 110 enables the second transistor T2 to coupled the supply voltage 76 to the battery IC pin 100. With transistor T2 enabled, transistor T1 is disable directly or by disabling the amplifier 94. When the reference voltage compares favorably with the threshold, the comparison module 110 disables the second transistor T2 and transistor T1 is enabled.

Within the comparison module 110, the third transistor T3 receives the reference voltage. When the reference voltage exceeds the gate-source threshold voltage of transistor T3, transistor T3 turns on. With transistor T3 on, the input of inverter 112 goes low and its output goes high turning off transistor T2. When the reference voltage does not exceed the gate-source threshold voltage of the transistor T3, the resistor R3 pulls the input of the inverter 112 high such that its output is low turning on transistor T2. In this manner, the start up circuit 92 provides an initial open control loop for the voltage supply circuit 35 such that a supply voltage 76 is produced once the battery is connected to the SOC 10. When the supply voltage 76 rises to a sufficient level for the reference circuit 90 to produce the voltage reference, then the open loop start up circuit turns off and the closed control loop of the resistors R1 and R2, the reference circuit 90, the transistor T1, and the amplifier 94 turns on to regulate the supply voltage 76 to a desired level regardless of the type of battery connected to pin 100.

FIG. 4 is a schematic block diagram of an embodiment of an RTC module 45 that includes a digital RTC section 120, an analog RTC section 122, and a data protection circuit 124. The digital RTC section 120 is coupled to the processing module 12 and both are powered via the SOC supply voltage 78, which is produced by the DC-DC converter 25 when it is enabled. The analog RTC section 122 is powered by the supply voltage 76.

In one embodiment, the analog RTC section 122 is coupled to provide at least one of alarm generation, seconds count, persistent register storage and access and the digital RTC section 120 retains a copy of data stored by the analog RTC section and provides updated data to the analog RTC section 122. The data transfer protection circuit 124 ensures accurate data transfers between the analog RTC section and the digital RTC section during a power down condition. For example, when a power down condition is detected, the data transfer protection circuit 124 ensures that a copying of data is terminated before the digital RTC section 120 is powered down. Thus, any data that was being transferred between the digital RTC section 120 and the analog RTC section 122 is terminated in a known manner avoiding any corruption or loss of data.

FIG. 5 is a schematic block diagram of an embodiment of the data protection circuit 124 that includes a delay circuit 135 and an AND gates 140 and 141. In this embodiment, the delay circuit 135 delays a data transfer request (e.g., a copy request) to produce a delayed data transfer request. The AND gate 140 ANDs the delayed data transfer request and a power stable indication to produce a power stable data transfer request. When the power stable indication indicates that the SOC is being powered down, the power stable data transfer request disables or prevents a data transfer between the digital RTC section 120 and the analog RTC section 122 in a known manner.

In this embodiment, the delay circuit 135 includes a plurality of flip-flops 130-138. Flip-flops 130-134 delay the copy request (e.g., a data transfer request) and flip-flops 136 and 138 delay the power stable indication. While not shown, the flip-flops 130-138 are clocked from the same clock, thus, due to the extra flip-flop, the copy request is delayed with respect to the power stable indication.

FIG. 6 is a schematic block diagram of an embodiment of a data protection circuit 124 that includes a delay circuit 135 and an AND gate 140. In this embodiment, the delay circuit 135 delays a data transfer request (e.g., a copy request) to produce a delayed data transfer request. The AND gate 140 ANDs the delayed data transfer request and a power stable indication to produce a power stable data transfer request. When the power stable indication indicates that the SOC is being powered down, the power stable data transfer request disables or prevents a data transfer between the digital RTC section 120 and the analog RTC section 122 in a known manner.

In this embodiment, the delay circuit 135 includes a plurality of flip-flops 132-138 and a delay block 142. Flip-flops 132-134 and the delay block 142 delay the copy request (e.g., a data transfer request) and flip-flops 136 and 138 delay the power stable indication. While not shown, the flip-flops 132-138 are clocked from the same clock, thus, due to the delay block 142, the copy request is delayed with respect to the power stable indication.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A system on a chip (SOC) comprises:
   a bus structure;
   a processing module coupled to the bus structure;
   read only memory (ROM) coupled to the bus structure;
   random access memory (RAM) coupled to the bus structure;
   a display interface coupled to the bus structure;
   an external memory interface coupled to the bus structure;
   a digital to analog conversion (DAC) module coupled to the bus structure, wherein the digital to analog converter produces an analog audio signal;
   an analog to digital conversion (ADC) module coupled to the bus structure;
   a headphone amplifier circuit coupled to amplify the analog audio signal;
   a battery integrated circuit (IC) pin coupled to receive a battery voltage;
   a real time clock module coupled to provide timing functions;
   a crystal oscillation circuit coupled to produce an oscillation; and
   a voltage supply circuit coupled to produce a supply voltage for at least a portion of the real time clock module and the crystal oscillation circuit, wherein the voltage supply circuit includes:
   a reference circuit coupled to produce a reference voltage based on the supply voltage;
   a transistor coupled to the battery IC pin, wherein the transistor produces the supply voltage based on a regulation signal and the battery voltage;
   an amplifier coupled to produce the regulation signal based on the reference voltage and a feedback representation of the supply voltage; and
   a start-up circuit coupled to enable the voltage supply circuit at battery connection, wherein the start-up circuit comprises:
   a second transistor coupled to the battery IC pin and the transistor; and
   a comparison module coupled to compare the reference voltage with a threshold, wherein, when the reference voltage compares unfavorably with the threshold, the comparison module enables the second transistor to couple the supply voltage to the battery IC pin.

2. The SOC of claim 1, wherein the comparison module comprises:
   a third transistor;
   a resistor coupled to the third transistor and the battery IC pin;
   an inverter coupled to the third transistor and the resistor, wherein, when the voltage reference exceeds the threshold voltage of the third transistor, the third transistor is enabled causing a first logic state at an input of the inverter and a second logic state at an output of the inverter, wherein the second logic state disables the second transistor.

3. The SOC of claim 1, wherein the real time clock (RTC) module comprises:
   an analog RTC section coupled to provide at least one of alarm generation, seconds count, persistent register storage and access, millisecond counter, and watchdog timer, wherein the analog RTC section is powered by the supply voltage;
   a digital RTC section coupled to the processing module and the analog RTC section, wherein the digital RTC section retains a copy of data stored by the analog RTC section and provides updated data to the analog RTC section; and
   a data transfer protection circuit coupled to the analog RTC section and the digital RTC section, wherein the data transfer protection circuit ensures accurate data transfers between the analog RTC section and the digital RTC section.

4. The SOC of claim 3, wherein the data transfer protection circuit comprises:
   a delay circuit for delaying a data transfer request to produce a delayed data transfer request; and
   an AND gate coupled to AND the delayed data transfer request and a power stable indication to produce a power stable data transfer request, wherein, when the power stable indication indicates the power down condition, the power stable data transfer request disables or prevents a data transfer in a known manner.

5. A system on a chip (SOC) comprises:
a bus structure;
a processing module coupled to the bus structure;
read only memory (ROM) coupled to the bus structure;
random access memory (RAM) coupled to the bus structure;
a display interface coupled to the bus structure;
an external memory interface coupled to the bus structure;
a digital to analog conversion (DAC) module coupled to the bus structure, wherein the digital to analog converter produces an analog audio signal;
an analog to digital conversion (ADC) module coupled to the bus structure;
a headphone amplifier circuit coupled to amplify the analog audio signal;
a real time clock (RTC) module that includes:
  an analog RTC section coupled to provide at least one of alarm generation, seconds count, persistent register storage and access, a millisecond counter, and a watchdog timer;
  a digital RTC section coupled to the processing module and the analog RTC section, wherein the digital RTC section retains a copy of data stored by the analog RTC section and provides updated data to the analog RTC section; and
a data transfer protection circuit coupled to the analog RTC section and the digital RTC section, wherein the data transfer protection circuit ensures accurate data transfers between the analog RTC section and the digital RTC section during a power down condition, wherein the data transfer protection circuit comprises a delay circuit for delaying a data transfer request to produce a delayed data transfer request and an AND gate coupled to AND the delayed data transfer request and a power stable indication to produce a power stable data transfer request, wherein, when the power stable indication indicates the power down condition, the power stable data transfer request disables or prevents a data transfer in a known manner; and
  a crystal oscillation circuit coupled to produce an oscillation.

6. The SOC of claim 5 further comprises:
a voltage supply circuit coupled to produce a supply voltage for the analog RTC section and the crystal oscillation circuit, wherein the voltage supply circuit includes:
a reference circuit coupled to produce a reference voltage based on the supply voltage;
a transistor coupled to an battery IC pin, wherein the transistor produces the supply voltage based on a regulation signal and a battery voltage received via the battery IC pin;
an amplifier coupled to produce the regulation signal based on the reference voltage and a feedback representation of the supply voltage; and
a start-up circuit coupled to enable the voltage supply circuit at battery connection.

7. The SOC of claim 6, wherein the start-up circuit comprises:
a second transistor coupled to the battery IC pin and the transistor; and
a comparison module coupled to compare the reference voltage with a threshold, wherein, when the reference voltage compares unfavorably with the threshold, the comparison module enables the second transistor to coupled the supply voltage to the battery IC pin.

8. The SOC of claim 7, wherein the comparison module comprises:
a third transistor;
a resistor coupled to the third transistor and the battery IC pin;
an inverter coupled to the third transistor and the resistor, wherein, when the voltage reference exceeds the threshold voltage of the third transistor, the third transistor is enabled causing a first logic state at an input of the inverter and a second logic state at an output of the inverter, wherein the second logic state disables the second transistor.

9. A voltage supply circuit coupled to produce a supply voltage for at least a portion of a real time clock module and a crystal oscillation circuit operating within a system having a battery integrated circuit (IC) pin coupled to receive a battery voltage, wherein the voltage supply circuit comprises:
a reference circuit coupled to produce a reference voltage based on the supply voltage;
a transistor coupled to the battery IC pin, wherein the transistor is configured to produce the supply voltage based on a regulation signal and the battery voltage;
an amplifier coupled to produce the regulation signal based on the reference voltage and a feedback representation of the supply voltage; and
a start-up circuit coupled to enable the voltage supply circuit at battery connection, wherein the start-up circuit comprises:
a second transistor coupled to the battery IC pin and to the transistor; and
a comparison module coupled to compare the reference voltage with a threshold, wherein, when the reference voltage compares unfavorably with the threshold, the comparison module enables the second transistor to coupled the supply voltage to the battery IC pin.

10. The voltage supply circuit of claim 9, wherein the comparison module comprises:
a third transistor;
a resistor coupled to the third transistor and the battery IC pin;
an inverter coupled to the third transistor and the resistor, wherein, when the voltage reference exceeds the threshold voltage of the third transistor, the third transistor is enabled causing a first logic state at an input of the inverter and a second logic state at an output of the inverter, wherein the second logic state disables the second transistor.

11. The voltage supply circuit of claim 9, wherein the real time clock (RTC) module comprises:
an analog RTC section coupled to provide at least one of alarm generation, seconds count, persistent register storage and access, a millisecond counter, and a watchdog timer, wherein the analog RTC section is powered by the supply voltage;
a digital RTC section coupled the processing module and the analog RTC section, wherein the digital RTC section retains a copy of data stored by the analog RTC section and provides updated data to the analog RTC section; and
a data transfer protection circuit coupled to the analog RTC section and the digital RTC section, wherein the data transfer protection circuit ensures accurate data transfers between the analog RTC section and the digital RTC section during a power down condition.

12. The voltage supply circuit of claim 11, wherein the data transfer protection circuit comprises:
  a delay circuit for delaying a data transfer request to produce a delayed data transfer request; and
  an AND gate coupled to AND the delayed data transfer request and a power stable indication to produce a power stable data transfer request, wherein, when the power stable indication indicates the power down condition, the power stable data transfer request disables or prevents a data transfer in a known manner.

* * * * *